United States Patent [19]

Miller et al.

[11] Patent Number: 5,351,805

[45] Date of Patent: Oct. 4, 1994

[54] METHOD AND APPARATUS FOR UNLOADING BULK MATERIALS

[75] Inventors: David J. Miller; Allen R. Miller; Charles P. Miller, all of McHenry, Ill.

[73] Assignee: Miller Formless Co. Inc., McHenry, Ill.

[21] Appl. No.: 129,803

[22] Filed: Sep. 30, 1993

Related U.S. Application Data

[60] Continuation of Ser. No. 7,542, Jan. 22, 1993, abandoned, which is a division of Ser. No. 750,971, Aug. 28, 1991, Pat. No. 5,191,966, which is a division of Ser. No. 549,895, Jul. 9, 1990, Pat. No. 5,078,261, which is a division of Ser. No. 144,428, Jan. 15, 1988, Pat. No. 4,957,198, which is a division of Ser. No. 848,907, Apr. 4, 1986, Pat. No. 4,738,350, which is a continuation of Ser. No. 672,151, Nov. 16, 1984, abandoned, which is a continuation of Ser. No. 414,383, Sep. 2, 1982, abandoned.

[51] Int. Cl.$^5$ .............................................. B65G 33/32
[52] U.S. Cl. .................................. 198/493; 198/661; 198/662; 198/666; 198/670
[58] Field of Search .............. 198/493, 670, 671, 662, 198/666, 669, 667, 661; 406/55, 53; 366/3, 5, 102

[56] References Cited

U.S. PATENT DOCUMENTS

| | | | |
|---|---|---|---|
| 2,073,059 | 3/1937 | Guthrie | 198/661 X |
| 2,233,085 | 2/1941 | Schweickart et al. | 198/579 |
| 2,507,245 | 5/1950 | Dady | 198/661 X |
| 2,559,557 | 7/1951 | Bailey et al. | 406/53 |
| 3,593,966 | 7/1971 | Munroe | 366/40 |
| 3,693,842 | 9/1972 | Cozzarin et al. | 406/55 |
| 3,836,019 | 9/1974 | Aralt | 414/141.5 |

FOREIGN PATENT DOCUMENTS

| | | | |
|---|---|---|---|
| 0050865 | 4/1966 | Poland | 198/666 |
| 807321 | 1/1959 | United Kingdom | 198/662 |

*Primary Examiner*—Cheryl L. Gastineau
*Attorney, Agent, or Firm*—Leydig, Voit & Mayer, Ltd.

[57] ABSTRACT

An unloader for bulk materials is provided to transfer material such as cement from a barge or other bulk container. It includes a moveable and rotatable support member such as a crane or cantilevered arm that is adjacent the bulk container. A first conveyor or auger is connected to the support for pivotal movement and extends generally horizontally. A second conveyor or auger is connected to the distal end of the first conveyor for pivotal movement and is generally vertically oriented. A feeder unit is connected to the distal end of the second conveyor for universal and rotational movement. The feeder includes an uplift portion communicating with the second conveyor, the uplift portion advancing the bulk material at a rate slower than the second conveyor, and a collector portion communicating with the uplift portion. The collector portion includes converging auger assembly to advance the bulk material towards the uplift portion and to assist in transferring it into the uplift portion. The apparatus may further include a selectively operable energy responsive aeration system to inject air into the bulk material while it is being handled by the unloader, a scraper assembly attached to the feeder unit to assist in removing the last of the bulk material from its container, and a take-away assembly to transport the bulk material away from the unloader.

5 Claims, 4 Drawing Sheets

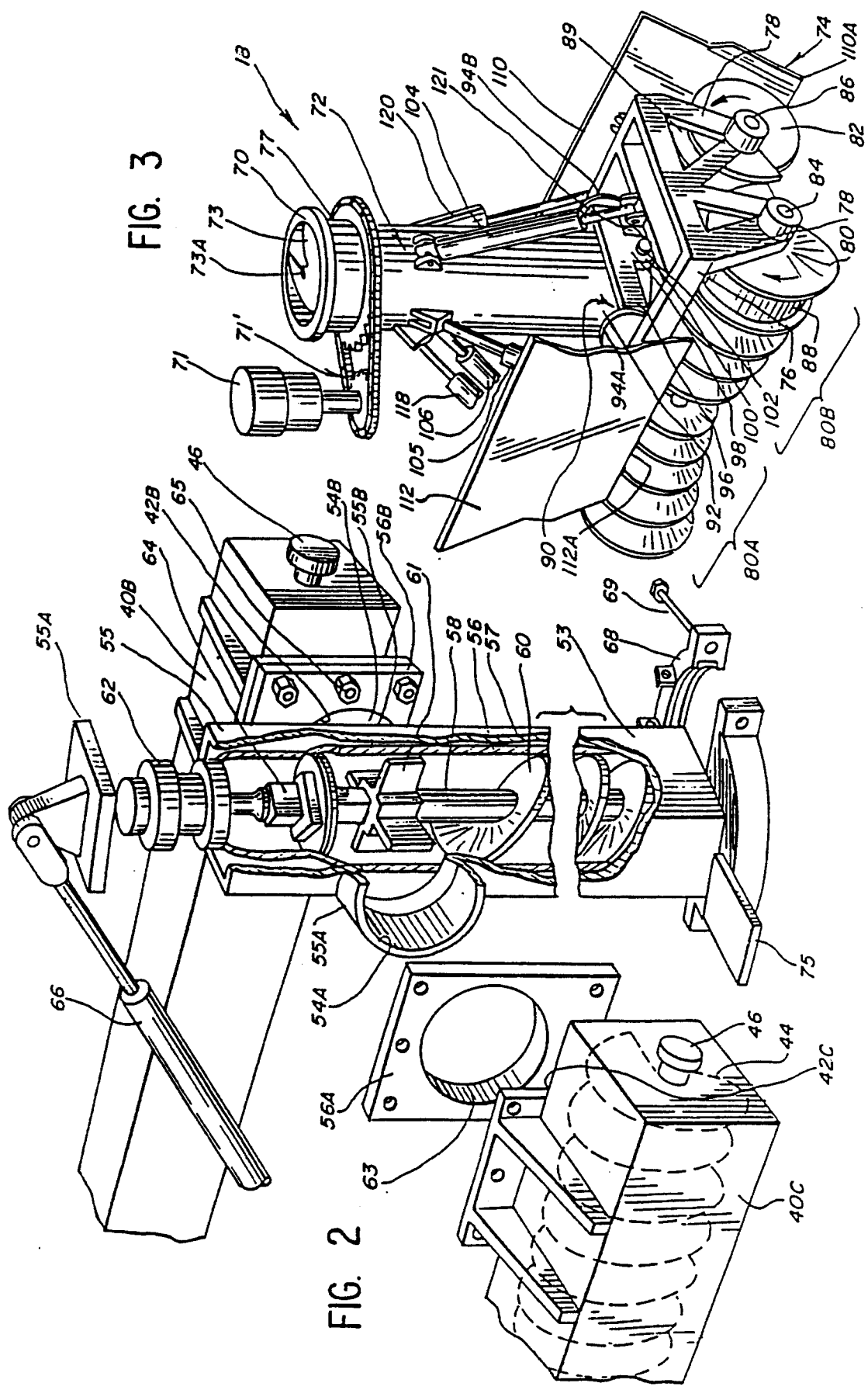

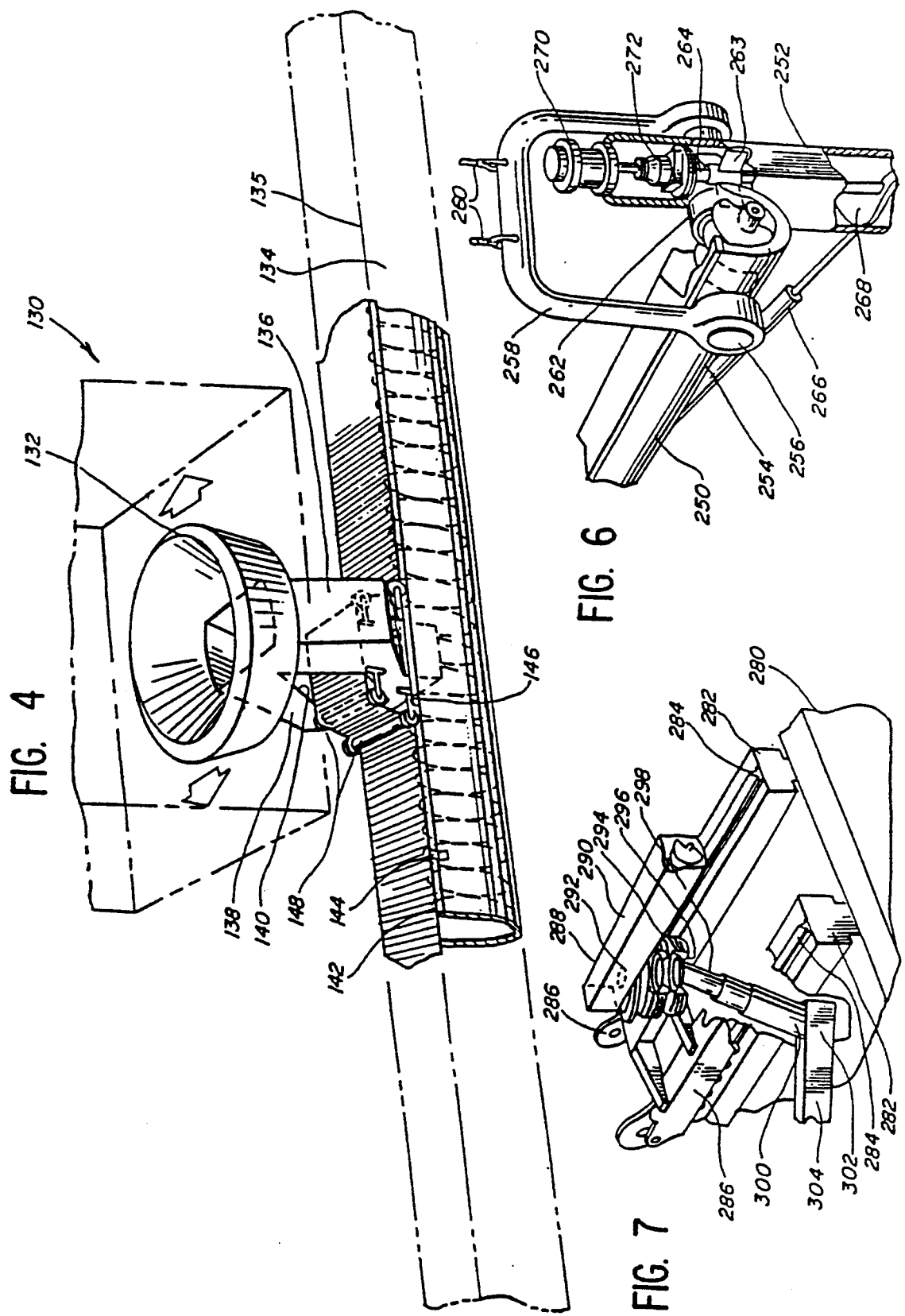

METHOD AND APPARATUS FOR UNLOADING BULK MATERIALS

This is a continuation of copending application Ser. No. 08/007,542 filed on Jan. 22, 1993, now abandoned which is a division of application Ser. No. 07/750,971 filed Aug. 28, 1991, now U.S. Pat. No. 5,191,966, which is a division of application Ser. No. 07/549,895 filed Jul. 9, 1990, now U.S. Pat. No. 5,078,261, which is a division of application Ser. No. 07/144,428 filed Jan. 15, 1998, now U.S. Pat. No. 4,957,198, which is a division of application Ser. No. 848,907, filed Apr. 4, 1986, now U.S. Pat. No. 4,738,350, which is a continuation of application Ser. No. 672,151, filed Nov. 16, 1984, now abandoned, which is a continuation of application Ser. No. 414,383, filed Sep. 2, 1982, now abandoned.

BACKGROUND OF THE INVENTION

This invention relates generally to the top unloading of bulk materials from relatively large cargo containers or vessels, or the transfer of bulk material from a cargo container to a material transport, handling or storage system. More particularly, this invention relates to the unloading of dry powder-like cement or other loose, dry material from a barge or the like. It is especially useful where the container does not have a self-contained unloading means or crane, or is not equipped with a gravity feed system. Moreover, the unloader of the present invention may be portable and self-contained, for operation from work barges, ships, or the like.

Dry cement is a fine powdered material (similar to talc) and is referred to hereinafter as "cement". Its size is very fine, 100 mesh or under; it is relatively free flowing at an angle of repose of 30° to 45°; and it is mildly abrasive. When aerated it becomes fluid-like, but when packaged or if it settles, it becomes very dense and difficult to handle. Cement is widely utilized in construction because it has strong adhesive properties after it is combined with water. Once properly mixed, it sets in a few hours and cures or fully hardens over a period of weeks.

Manufactured in large plants, the cement may be transported in bulk quantities by truck, rail or barge. However, due to its physical properties and fickle nature, cement requires a unique handling system. Small quantities may be conveniently unloaded or moved with a pneumatic system, but this has not proven efficient or effective for larger quantities. Thus, mechanical systems have been relied upon. However, due to its powdery nature, the density of cement may vary from a relatively light, fluffy and fluid-like or relatively free flowing aerated mixture of less than fifty pounds per cubic foot, to a heavy, more solid and concentrated mass of over 150 pounds per cubic foot.

Depending upon the conditions encountered upon loading and during transport, the cement may become tightly compacted, requiring a mechanical, rather than pneumatic, unloader. In addition, when the cement is being transported, and even during the unloading process, the movement and vibration may cause the cement to settle or compact to its more dense state, causing pneumatic systems to plug and mechanical systems to jam, overload or bind. This usually results in undesirable and expensive down-time, accelerates wear and tear on equipment that is already operating in a harsh environment, and may result in equipment failure. On the other hand, even when the cement is in its fluffy aerated condition, it poses unique handling and transport problems because it is dust-like and requires a closed transport system to minimize pollution, loss, and wear of equipment due to abrasion. This also protects the cement from exposure to elements which may contaminate it, or cause it to absorb moisture and harden. For this latter reason, it is important that the bulk container be emptied completely so that residual cement does not set up and harden each time the container is used.

Other bulk material unloading systems are available and known in the prior art, but most are gargantuan, requiring heavy capacity dockside cranes, ship derricks, or the use of gantry cranes that are supported by the container or barge. Still others are not suitable for handling cement. In addition, some of these unloaders required that the barge or container be moved in order to reach all areas of the interior of the container.

OBJECTS OF THE INVENTION

It is an object of the present invention to provide an improved unloader for bulk materials, and particularly one that is capable of efficiently handling and unloading cement.

It is a further object of the present invention to provide an improved unloader for transferring bulk materials from barges and other material containers to a material transport, handling, or storage system.

It is a still further object of the present invention to provide an improved unloader that may reach all areas of the cargo container to remove nearly all of the bulk materials.

It is a still further object of the present invention to provide an improved unloader that will, if necessary, aerate the cement, and maintain the density of the cement sufficiently low to minimize transfer problems.

SUMMARY OF THE INVENTION

The invention is embodied in an apparatus for unloading a supply of bulk materials. It includes a rotatable support means. A first conveyor means is connected thereto and generally horizontally supported for pivotal movement relative to the support. A second conveyor means is connected to the first conveyor means and generally vertically supported for pivotal movement with respect to the first conveyor means. A feeder means is attached to the second conveyor means proximate its distal end and includes an uplift portion and a collecting portion. The uplift portion is attached to the second conveyor means and advances the bulk material at a rate slower than the second conveyor means.

The collecting portion is attached to the uplift portion and advances the bulk material from the supply to the uplift portion. In operation, the bulk material is moved by the collecting portion into the uplift portion, moved into the second conveyor means, transferred to the first conveyor means, and discharged therefrom. The invention may further include an aeration system to inject air into the bulk material during transport by the unloading apparatus, a set of scrapers mounted on said feeder means to assist in removing the last portions of the bulk material from the container, dust-tight conveyors to minimize loss and contamination of the material, and a take-away system to carry the bulk material to another location after it has been unloaded.

DESCRIPTION OF THE DRAWINGS

FIG. 2 is a perspective, partially exploded and cutaway view of the second or generally vertical conveyor means of the present invention, and its pivotal connections to the first or generally horizontal conveyor means.

FIG. 3 is a perspective, partial cutaway view of the feeder head of the present invention, with one of the scraper means in a lowered position.

FIG. 4 is a perspective view of a take-away means of the present invention as it is usually disposed, i.e. underneath the support means, to receive the unloaded bulk material. The base of the support means is illustrated in phantom lines.

FIG. 6 is a perspective, partial cutaway view of an alternate embodiment of a portion of the present invention, illustrating the pivot connection between the first and second conveyor means being suspended from overhead.

FIG. 7 is a perspective, partial cutaway view of an alternate embodiment of a portion of the present invention, illustrating a connection between the first or generally horizontal conveyor means and a take-away means.

DESCRIPTION OF THE PREFERRED EMBODIMENT

Figure 1:
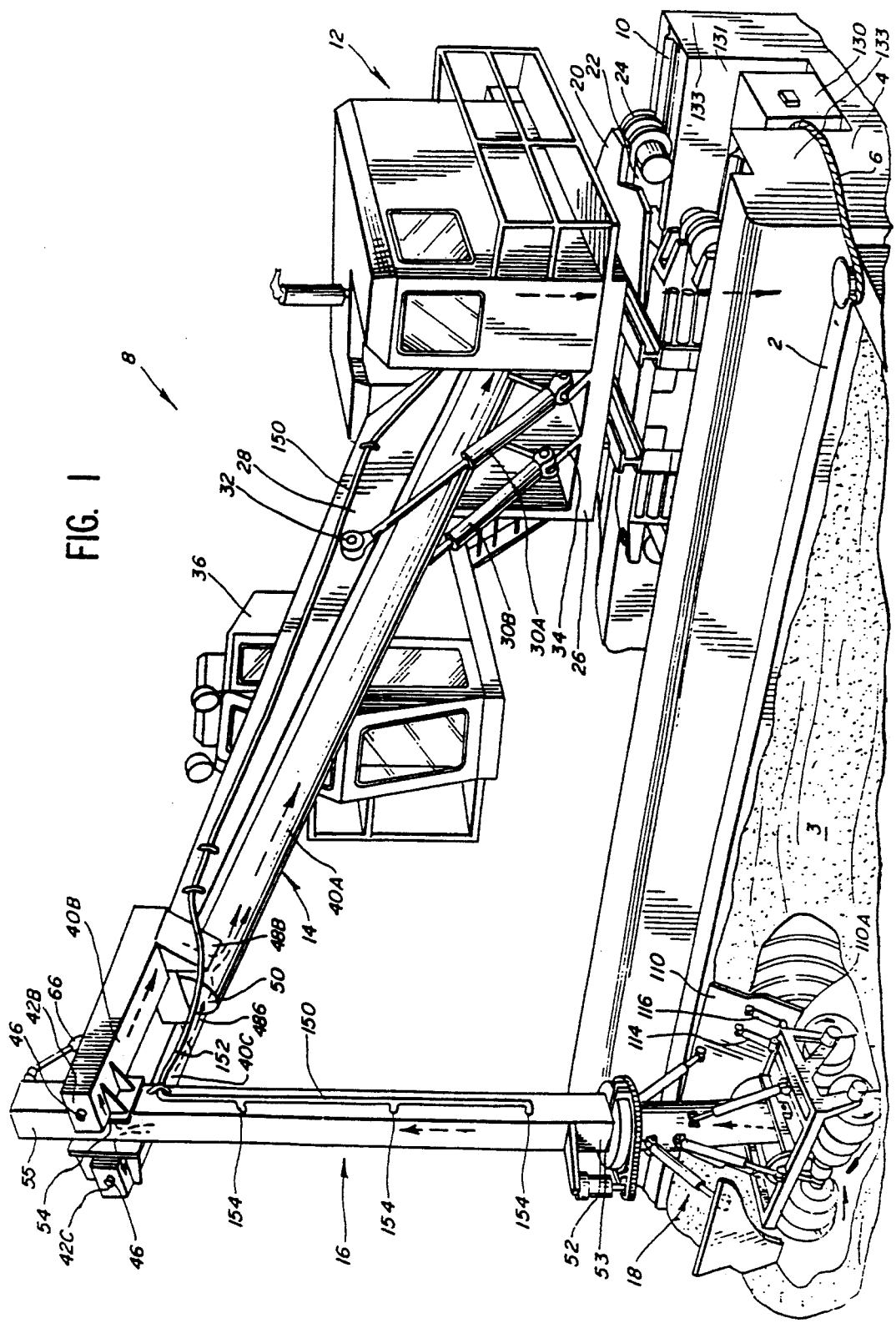
FIG. 1 is a perspective view of the unloading apparatus of the present invention illustrating the feeder head engaging the bulk material and with the scraper means raised.

As seen in FIG. 1, a barge 2 or other vessel or container of bulk material 3 is floated and secured next to a dock structure 4, pier, or other unloading area by cable 6 or the like to maintain it in position. The bulk material unloading apparatus 8 is adjacent the edge of the dock structure 4 and selectively moves parallel to the barge on rails or tracks 10. The unloader 8 generally comprises a support means 12, a first conveyor means 14, a second conveyor means 16, and a feeder means 18. Each of these components is discussed in detail in the following description, with reference to the drawings.

As illustrated, a set of tracks or rails 10 runs parallel to the barge to support and selectively transport the unloading apparatus 8 without moving the barge. Alternatively, the unloading apparatus could be mounted on crawler tracks (see FIG. 5) or mounted on rails for movement perpendicular to the length of the barge. In addition, it may be desireable or more convenient to move the barge rather than the unloading apparatus.

The support means 12 includes an undercarriage 20 that comprises trucks 22 of conventional design having suitably journaled wheels 24 retained therein. The wheels illustrated are double flanged, i.e. H-shaped when viewed from a radially distant position, and are complimentary to the rails 10. Suitable motive and braking means (not shown) may power or lock the wheels as necessary or desireable to effect movement or retain the undercarriage in position along the length of the rails 10.

A support platform 26 is superposed the undercarriage 20 and is preferably selectively rotatably mounted thereon, for crane-like, rotational or panning movement about a vertical axis independent of the undercarriage.

The platform 26 forms a convenient base for any motive power necessary for the unloader. A boom 28 has its proximal end attached to the platform 26 in a conventional manner for pivotal movement in a vertical plane. The boom may be of any convenient configuration provided that its length is sufficient to reach from the support 12 to approximately the center of the barge 2, and further provided that it will support the weight of the conveyor means, feeding means, and material in transit.

A pair of extensible cylinders 30A, 30B, suitably controlled by hydraulic fluid or the like, raise and lower the boom, and retain it in a selected vertical position as desired by the operator. The cylinders 30A, 30B may be of any type well known in the art, as may be their controls, and they typically extend between a somewhat centrally located standard 32 on the boom and a portion 34 of the platform displaced from the proximal end of the boom 28 where it is attached to the platform. The cylinders are preferably double action to exert additional downward force if necessary. In addition, they may incorporate a balance feature which exerts sufficient upward pressure on the boom to minimize the weight imposed on the feeder head, yet still keep it in contact with the cement.

An operator's cab 36 is positioned adjacent the boom to provide an unobstructed view of the bulk material container. All controls for the operation of the unloader and equipment monitoring its operation may be located in the cab.

Figure 5:
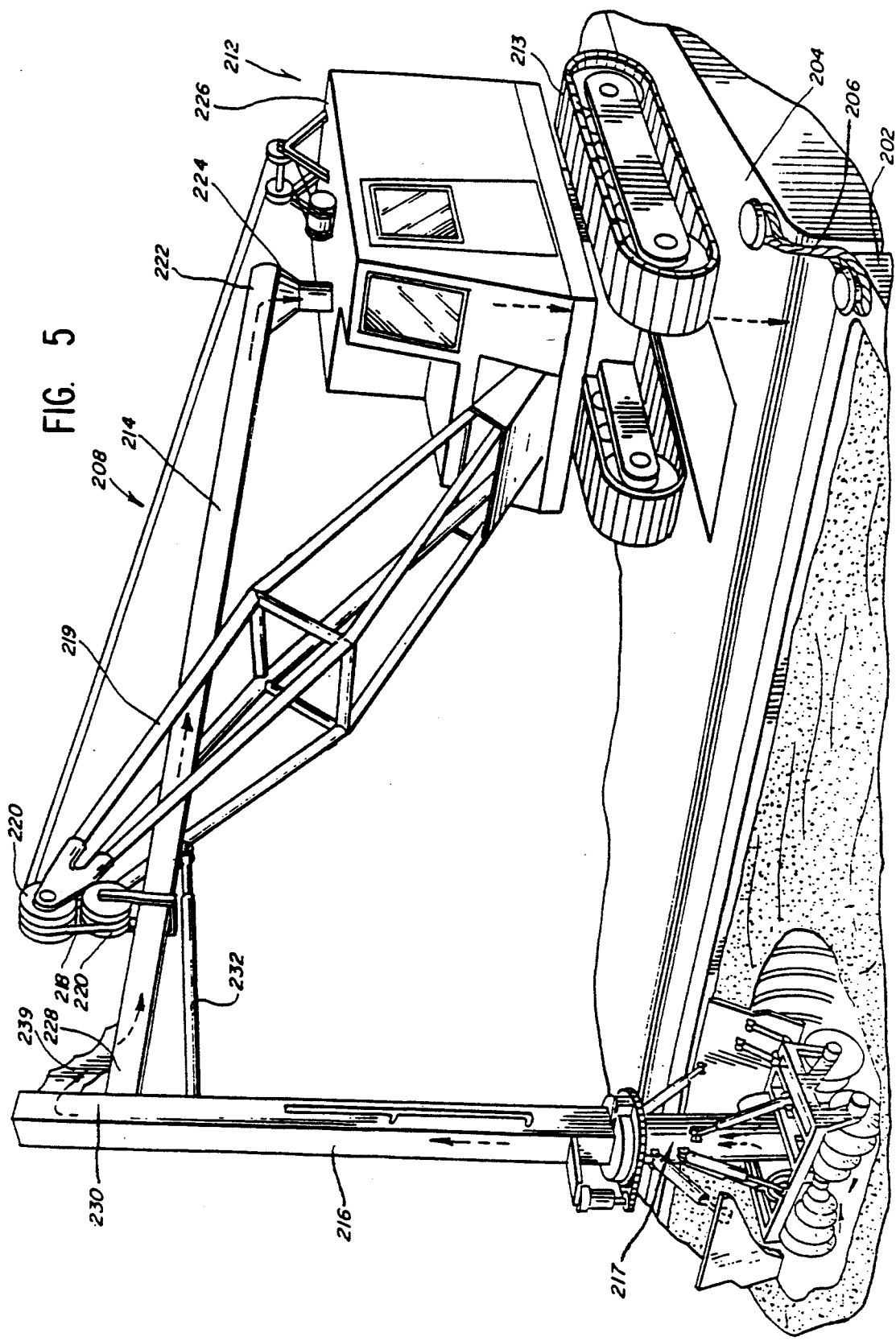
FIG. 5 is a perspective view of an alternate embodiment of the unloading apparatus of the present invention.

The first conveyor means 14 is an auger that is generally horizontally supported by, and may be attached to, the boom 28 in a convenient manner. In FIG. 1, it is attached to the underside of the box-like boom 28, and, as an alternative, it may be suspended from a boom as illustrated in FIG. 5. In FIG. 1, the first conveyor comprises a main portion 40A and a yoke portion 40B, 40C, all three portions being supported by the boom 28. Each portion is an auger or screw type conveyor. The augers for each portion are preferably single screws, each having suitable bearings provided as necessary, such as 46, and each may be powered with a bidirectional variable speed hydraulic motor. These generally horizontal augers may be of uniform pitch to provide a uniform feed along their entire length. A relatively long or high pitch is preferred to maintain rapid movement of the cement. Further details on auger design are discussed in connection with the second or generally vertical auger.

Referring also now to FIG. 2, and using like numerals to designate like items, the entrance or intake portion 42B, 42C of each respective side of the yoke portion 40B, 40C is disposed proximate the distal end of the first conveyor means, and is adjacent one end of an internal screw-like auger 44. The discharge end 48B, 48C of the respective yoke portions transfer the bulk material from the yoke augers to each side of the intake end 50 of the main portion 40A of the first conveyor means, which discharges preferably near the center of rotation of the support means 12. The sheath or housing for each auger may be cylindrical or rectangular, and is preferably dust-tight.

The second conveyor means 16 is pivotally connected to the distal end or yoke end of the first conveyor means, and is generally vertically suspended therefrom. Like the first conveyor means 14, the second conveyor means is an auger or screw type conveyor, similarly powered, with an intake 52 at the distal end 53 and a pair of oppositely directed, tubular, tangentially extending discharge portions 54A, 54B at the proximal end 55.

Referring primarily to FIG. 2, the conveyor or auger sheath 56 houses an auger shaft 58 having a single helical flight 60, or alternatively multiple flights, attached along the length thereof. The auger sheath is cylindrical, to match the auger screw, and it may be disposed within a second housing sleeve, such as the box-like one designated 57, for additional support. The flight increases in pitch from intake to discharge along at least a portion of the length of the second conveyor beginning at the intake to help maintain a loose or aerated state of the material. A set of paddles 61 is radially attached to the auger shaft 58 in spoke-like fashion directly adjacent the discharges 54A, 54B to assist in tangentially discharging the material from the second auger to the intakes of the yoke portions 40B, 40C. A hydraulic motor 62 is attached to the auger sheath and coaxial with the auger shaft. The motor is connected to the auger shaft 58 through a thrust bearing 64.

Each discharge 54A, 54B comprises a tubular conduit 55A, 55B extending from and at right angles to the length of the second conveyor 16, and each is received by a flange plate 56A, 56B defining mating sleeve apertures 63. The flange plates each releasably secured to, with its aperture 63 coaxial with, the intake 42C for the respective yoke portion 40B, 40C of the first conveyor means. When assembled, as shown in the upper right portion of FIG. 2, each discharge or proximal end 54A, 54B of the second conveyor means is pivotally mounted in dust-tight relation to the distal end of the first conveyor means, being disposed in the space defined between the two yoke portions 40B and 40C. Assembly or repair is facilitated by, typically, nut and bolt fastening means 65.

The first and second conveyors are maintained in a common plane and the angle between them may be selectively maintained or changed by an extendible cylinder 66 having one end attached to the first conveyor 14 and a second end attached to the proximal end 55 of the second conveyor 16 by suitable means, such as a cap 55A which is situated on or near the top of the second conveyor means. Such a cylinder may be hydraulically actuated by a conventional control located in the cab 36.

The bearings along the length of the augers deserve special attention due to the abrasive nature of the cement, which may result in a short operational lifetime. As a result, conventional bearings are not suitable. One of the more successful designs utilized by applicants comprises a hard iron cylindrical race with a hardened steel auger shaft therethrough. There is a loose fit between the two and the cement impregnates the two wearing surfaces of the bearing and fills the space between them to act as a buffer zone to lubricate and cool the wearing surfaces. However, if the auger is run at a relatively high rate of revolution, the cement is centrifugally cast to the periphery of the auger flighting and the bearing has no cement for lubrication. This can result in rapid deterioration of the bearing and shaft. This problem has been satisfactorily resolved by precision manufacturing of the auger screw and casing sections, so both are straight or very nearly so, as opposed to having a bowed or banana shape along their length. And, by minimizing the clearance between the auger screw flighting and the surrounding casing, the linear alignment of the auger shaft may be held within smaller tolerances. This further provides an unexpected improvement in efficiency of operation by minimizing slippage of the cement between the auger screw and casing, and permitting operation in the range of 300 to 500 revolutions per minute, which is generally considered to be high speed operation.

Referring now to FIGS. 1–3, the distal or intake end 53 of the second conveyor means 16 includes a split receiving collar 68 fixedly attached to the auger sheet. The collar conforms to an annular flange 70 (see FIG. 3) disposed around the top periphery or discharge end of the feeder means 18. The collar 68 is clamped or compressed circumferentially by a bolt and nut set 69 to engage over the flange 70 and rotatably retain it in dust-tight relation so that the uplift portion 72 of the feeder means 18 is colinear with the second conveyor means 16. A hydraulic motor 71 or the like is attached to the second conveyor means 16 by attachment to the underside of a plate 75, with a sprocket and chain drive 71' operatively connecting it to the uplift portion 72. Operation of the motor will cause the entire feeder head 18 to rotate around its auger axis in either direction with respect to the second conveyor means 16 by turning the flange 70 within the collar 68.

Referring more particularly to FIG. 3, the feeder means 18 includes an uplift portion 72 and a collecting portion 74. The collecting portion includes a pair of counter-rotating augers 80, 82 that cause the bulk material to converge near the center of the collecting portion, and the uplift portion is an auger conveyor that moves the converged material upwardly to the entrance of the second or vertical conveyor means 16. A more detailed description follows.

The collecting portion 74 has an open, rectangular frame 76 with depending V-shaped brackets 78 on each end thereof. The brackets support a pair of unenclosed augers 80, 82 for fixed parallel rotational movement. Each auger has a single central shaft 84, 86 connected to its respective bracket by a suitable enclosed, internal hydraulic drive 88, 89 to rotate the auger shafts in opposite directions. Each auger shaft is divided into two sections of substantially equal length, such as 80A and 80B, each having flighting of opposite pitch so that rotation of the shaft conveys material from each journalled end of each shaft to the center of the collecting portion. In addition, the diameter of each auger half for each shaft decreases from the journalled end to the center portion, resulting in a tapered flight conveyor.

The central portion 90 of the frame 76 is connected to the inlet portion 92 of the uplift section for universal movement by a gimbal arrangement, i.e. movement similar to that of a universal joint in an automobile drive shaft or that of a gyrocompass. Specifically, rocking motion (i.e., pivoting about an axis perpendicular to the auger shafts 84, 86 and perpendicular to the axis of the uplift section 72) is accomplished by attaching to the frame 76, on opposing interior sides thereof, circular plates 94A, 94B that are mounted for free rotation along an axis perpendicular to the auger shafts 84, 86 and perpendicular to the longitudinal axis of the auger shaft for the uplift section 72. The circular plates 94A, 94B are connected together for simultaneous rotation by cross members 96 along opposite sides of uplift portion 72 and each having a length slightly longer than the outside diameter of the sheath for the uplift section. (The cross member on the opposite side is not shown.) Each cross member includes a centrally located depending tab 98, each tab having an aperture 100. This tab permits pitching motion of the frame 76 about an axis parallel to the auger shafts 84, 86 and perpendicular to the axis of the uplift section 72. This is accomplished by connecting the exterior of the sheath for the uplift section 72 to the depending tab 98 by a pintle 102 extending through apertures 100. The pintle extends parallel to the auger shafts 84, 86 and perpendicular to the axis of the auger shaft for the uplift section 72. In this fashion, the circular plates 94A, 94B and the cross members 96 comprise a sub-frame that is rotationally mounted to the frame 76 of the feeder 18.

The orientation of the collecting portion 74 with respect to the uplift section 72 may be controlled by two sets of opposing extensible cylinders 104-106 (one of the cylinder is not illustrated), such as hydraulic cylinders. The four cylinders are radially disposed around the axis of the uplift conveyor, each 90° from its adjacent cylinders. One end of each cylinder is attached to the uplift section 72, and the opposite end of each cylinder is attached to the collecting portion, preferably its frame 76. Movement may be induced by other suitable means, and it may be limited by the use of mechanical stops.

Also attached to the frame 76, preferably on opposite sides parallel to the axes of the auger shafts 84, 86, are a pair of independently operable scraper plates 110, 112. Each plate is attached to the frame by separated pairs of spaced, hinged arms, such as 114, 116 in FIG. 1, which form a parallelogram linkage and permit the plates to be raised and lowered. The parallel arms permit the lower edges 110A, 112A to descend to a position at least as low as the lowest portion of the augers 80, 82 so that each edge may come into contact with the floor of the barge or container. Controllable extensible cylinders 118, 120, raise and lower the scraper plates 112 and 110 respectively. One end of each cylinder is attached to the uplift section 72, and the opposite end is connected to the corresponding scraper plate.

The uplift portion 72 incudes a screw auger 73 extending upwardly from the center portion of the frame 76 for the collecting portion 74. The intake 121 of the uplift portion is a slightly tapered exposed screw auger (i.e., not covered by a housing sheath) which extends downward below the illustrated frame 76 and cross members 96 and between the center sections of the two collecting augers 80, 82. The diameter of the uplift auger 73 is substantially the same as the auger for the second conveyor means 16, e.g., 12 inches, except that it tapers from 12 inches to approximately 10 inches where exposed on the lowermost or intake end 121. The degree and amount of taper may be varied as desireable. The tapered intake end is disposed approximately midway between the counter-rotating rotating auger shafts 84, 86 of the collecting portion 74, along a common radius connecting the axial center of each shaft.

The uplift auger 73 is a double flight short pitch screw conveyor, its pitch being less than that of the vertical or second conveyor means 16. This provides more efficient movement of cement by reducing slippage, and a more constant or even flow.

The discharge end 77 of the uplift section includes the annular collar 70 for selective rotational attachment to the second conveyor means 16, as described earlier. The uppermost end 73A of the auger shaft 73 is connected to the auger shaft 58 of the second conveyor means, which provides rotational driving force. Although the two augers rotate at the same speed, the second conveyor means 16 advances the material at a faster rate due to its greater pitch. This dedensifies the cement to maintain it as an aerated fluffy compound and prevent it from packing. The uplift auger is approximately four feet long and the vertical auger is approximately 24 feet long, although these lengths may vary as necessary or desireable.

Referring now to FIG. 4, there is illustrated a take-away means 130 of the present invention. Referring also to FIG. 1 the take-away means is disposed underneath the support means 12 in a channel 131 defined by the supports 133 for the rails 10, and preferably is coextensive with the length of the barge 2 to permit the operator of the unloader maximum range of movement. The take-away means generally includes a funnel 132 that collects material discharged from the proximal end of the first or generally horizontal conveyor means 14, and a conveyor means 134 extending parallel to the tracks 10 to transport the material to another location.

The frusto-conical funnel top 132 is preferably suspended, by any convenient means, from the support platform 26 or trucks 20 of the support means 12, and moves therewith. The discharge of the first conveyor is disposed above the center of the funnel 132, and both are preferably centered at the vertical axis of rotation of the support means. The connection between the discharge of the conveyor 14 and the funnel 132 is preferably dust-tight. A pair of discharge chutes 136, 138 are connected to and disposed beneath the funnel top 132 to confine and slideably transport the material away from the funnel. The chutes 136, 138 are bifurcated or elbowed to form a transverse aperture 140 therebetween.

The conveyor means 134, including a frame 135, may be a conventional screw-type or belted conveyor, whichever is appropriate for the material being handled. As illustrated, the conveyor is covered by a fixed flexible belting 142 of suitable weight and width, such as known conveyor belting, that forms a generally dust-tight seal with the top of the screw conveyor 134. Tapered guides 144 be positioned along the length of the conveyor at its upper edges as necessary to assist in positioning the cover.

A carriage 146, suspended from the moving funnel 132 or riding on top of the conveyor frame 135, lifts and guides the cover through the transverse aperture 140 beneath the funnel top 132. The carriage may be of convenient design and use rollers, guides or skids 148 to continually lift and hold the cover 142 off the conveyor frame at the situs of the discharge chutes 136, 138, as the apparatus 8 traverses therealong on tracks 10, yet maintain the cover in a closed dust-tight relationship at all other locations.

Referring again to FIGS. 1 and 3, an aeration system is utilized to inject compressed air into the cement or other material to "fluff" it, or disperse it to prevent it from becoming too densely packed. A supply of compressed air (not shown) may be conveniently located in the support means 12 and is connected to a conduit 150 that is attached to and traverses the length of the first and second conveyor means 14 and 16. A suitable flexible tubing 152 may be utilized as necessary to accommodate pivot or universal connections. A series of nozzles 154 placed one every several feet, conducts the compressed air through the sheath 56 of the auger conveyor means to inject air into the cement. This effectively keeps the cement in suspension. The nozzles may be installed in as many locations as necessary or desireable, depending upon the conditions encountered.

Air is injected by a mechanism, well known in the art, that is responsive to the torque requirements to power the auger screw. As the cement begins to pack more densely, more torque is required, as measured by the magnitude of the pressure drop across the hydraulic supply line and return line to the hydraulic motor rotating the screw. When the pressure differential exceeds a predetermined level, the aeration system is activated to inject air and thereby lessen the cement density and reduce the torque requirements. At the present time, applicant utilizes three nozzles along the length of the vertical or second conveyor means. The pressure of the air supply tank is maintained at about 150 pounds per square inch, and, upon actuation, air is injected into the auger perpendicular to its length at a rate of about 50 cubic feet per minute. The air injection provides an almost immediate reduction in density and reduction of torque requirements, which terminates the air injection after about one second. Due to the ability of cement to harden after it becomes wet, it is especially desireable to eliminate any condensate from the compressed air system.

Referring now to FIG. 5, an alternate embodiment of the present invention is illustrated, although many of the components and elements of this alternate embodiment are identical to those described and illustrated in FIG. 1. A barge 202 is secured to a dock 204 by a cable 206. The unloader 208 is adjacent the dock and may selectively move as necessary or desired. The unloader comprises a support means 212, a first conveyor means 214, a second conveyor means 216, and a feeder means 217.

The support means 212 differs from that in FIG. 1 mobility to the unloader. However, this additional mobility may interfere with the installation of a permanent take-away system, as illustrated in FIG. 4.

The boom 219 is pivotally attached to the support means in a conventional manner, and its position and movement may be controlled in any known fashion. The first conveyor means 214 passes through the boom 219 and is suspended therefrom by cables 218 and pulleys 220 to a desired height. The discharge end 222 of the first conveyor is proximate the center of rotation of the support means 212 and superposed a funnel shaped discharge chute 224.

The discharge chute 224 may empty into a take-away conveyor (not shown) positioned in a convenient location. For example, it may extend from the top 226 of the support means 212, or it may extend from between the tracks 213 below the support means, collecting the material after it has been discharged by the first conveyor means and fallen the depth of the support means to a location beneath it.

The distal or intake end 228 of the first conveyor means 214 is pivotally connected to the discharge or proximal end 230 of the second conveyor means. An extendible cylinder 232, one end connected to the first conveyor 214 and the other end connected to the second conveyor 216, selectively controls the angle between the two. A dust-tight flexible boot or slide 239 may be utilized to transport the cement discharged from the second conveyor 216 to the intake of the first conveyor 214.

The feeder means 217 is as described earlier herein.

Referring to FIG. 6, an alternate embodiment is illustrated for the connection and suspension of a first or generally horizontal conveyor means 250 and a second or generally vertical conveyor means 252. The two conveyor means are connected for pivotal movement in parallel adjacent substantially common planes. The first conveyor 250 has its discharge end (not illustrated) supported by means such as illustrated in FIGS. 1 and 4. The intake or distal end 254 is supported in a conventional manner by a pin 256 and clevis 258 arrangement that is suspended from an overhead arm or the like (not illustrated) by cables 260. The second conveyor 252 is vertically suspended from the pin and clevis and is pivotally connected thereto. The discharge of the second conveyor 252 communicates to the intake of the first conveyor 250 through a collar or passageway 262 located radially outwardly from the auger paddles 263 which are attached to the auger shaft 264 for rotational movement immediately adjacent the discharge collar 262. The angle between the two conveyors may be selected and maintained by an extendible cylinder 266 as disclosed earlier. The auger 268 for the second conveyor means 252 may be driven by a hydraulic motor 270 through a bearing 272, as disclosed earlier.

Referring now to FIG. 7, an alternate embodiment is illustrated for the orientation and movement of the support means and for the take-away means. A barge 280 is secured next to a dock structure 282 to maintain it in position. A set of tracks or rails 284 extends perpendicular to the length of the barge to support and selectively guide the unloading apparatus. A set of trucks 286, such as disclosed in FIG. 1, rollingly engages the rails 284 and transports the support means, which is not illustrated but is similar to that already disclosed. The proximal end 288 of the first conveyor means 290, which is suitably supported, includes a discharge 292 proximate the center of rotation of the support means. Immediately below and connected to the discharge, a flexible joint 294 permits the first conveyor to be raised, lowered, or pivoted, yet still maintain a dust-tight enclosure. The discharge end 296 of the flexible joint is connected to the intake of a telescoping gravity slide 298. The discharge end 300 of the slide 298 is connected to the intake end 302 of a take-away conveyor 304, also suitably supported. The flexible joint 294 permits the telescoping slide 298 to change its orientation with respect to the support means yet still maintain a dust-tight seal.

DESCRIPTION OF THE OPERATION

Referring primarily to FIGS. 1-4, a barge is secured adjacent to an unloading area 4 and the unloading means 8 is moved into position by its trucks 22 moving along the rails 10. The boom 28, already being in a raised position, is lowered by shortening the extendible cylinders 30A, 30B. Simultaneously, the second conveyor means 16, including the feeder means 18, is extended with respect to the first conveyor means 14, and the boom 28, by contracting the extendible means 66 to enlarge the angle between the two conveyor means. The boom is lowered by the cylinders 30A, 30B until the converging augers 80, 82 of the feeder means come into contact with the cement 3 or other bulk material.

With all of the conveyors being energized, the augers 80 and 82 of the feeder means are rotated in opposite directions by their respective hydraulic motors to draw the cement to the center of the collecting portion 74. The exposed auger flighting moves the material to the center and causes it to converge around the exposed, tapered, double flight auger of the uplift portion 72. Although the intake portion of the uplift auger does not have a sheath, the material packs around the intake to define a quasi-sheath and load the auger screw with material for upward transport.

The uplift portion 72 moves the cement upwardly towards the discharge end of the uplift portion which is coincident with the intake portion of the second conveyor means. The uplift portion provides a relatively steady and even rate of discharge of material.

The second conveyor means 16, having an auger with a higher pitch than the auger of the uplift portion, accelerates the cement upwardly, lessening its density and improving its flow-ability. The cement continues upwardly to the discharge of the second conveyor where it is transferred to the intake 42B, 42C of the yoke portion 40B, 40C of the first conveyor 14. The cement continues along the auger yoke portion to the discharge end 48B thereof, which is in communication and coincident with the intake of the first conveyor 40A. The cement is transferred along the first conveyor means 40A by the auger contained therein and is discharged into the funnel 132 disposed immediately therebelow. The cement passes through the funnel into the discharge chutes 136, 138, underneath the raised belting 142, and into the take-away conveyor 134. The cement is then transferred to another location or stored.

As the cement is moved by the augers, it may pack or become more dense, requiring more torque to rotate the augers. Should the torque exceed a predetermined level, the aeration system is energized to supply compressed air along conduit 150 to the nozzles 154, which inject air into the vertical conveyor, or other conveyors as necessary, and fluff or aerate the cement, making it less dense and lessening the torque requirements to rotate the auger.

The operator may rotate the feeder means 18 with respect to the second conveyor means 16 as necessary by selective operation of the hydraulic motor 71, and he may tilt or pitch the feeder means with respect to the uplift section 72 by manipulating the opposing extendible cylinders 104–106. In addition, the operator may change the radial position of the feeder head by panning the support means about its axis of rotation, or change its depth by raising or lowering the boom 28 and flexing or extending the first conveyor means with respect to the second conveyor means through the operation of the extensible cylinder 66. This provides a back hoe-like operation and permits the operator to reach into the various corners of the barge and beneath any lips surrounding the top of the barge.

Due to the propensity of cement to absorb moisture and harden, it is desireable to remove all of the cement from the barge. The present invention facilitates the ability to do that by lowering the scraper plates 110 or 112, as necessary, to scrape the bottom, walls or corners of the barge. Absent the scraper plates, a layer of cement about ½ a foot deep will most likely be left in the bottom; with the scraper plates lowered, this may be reduced to one inch or less, depending upon the flatness of the barge floor.

The invention has been described in detail with particular reference to a preferred embodiment and selected alternative and the operation thereof, but it is understood that other variations, modifications, and the substitution of equivalent mechanisms can be effected within the spirit and scope of this invention, particularly in light of the foregoing teachings. For instance, one may substitute a belted conveyor for the first or generally horizontal conveyor provided that the belted conveyor is maintained in a generally horizontal position.

What is claimed is:

1. A method of transferring a supply of aeratable bulk powder material disposed at a first location to a predetermined second location, said method comprising successively advancing portions of the bulk powder material to a predetermined area of the first location; successively moving at a first rate the advanced bulk powder material portions in a first closed conveyor portion from the predetermined area in a generally vertically oriented direction to a first elevated station; successively moving at a second rate faster than the first rate the bulk powder material portions from the first elevated station in a generally vertically oriented direction and in a second closed conveyor portion communicating with said first conveyor portion to a second elevated station above said first elevated station thereupon conveying the bulk powder material portions in a generally laterally oriented direction from the second elevated station to the second location.

2. The method of claim 1 wherein each of said closed conveyor portions is an auger conveyor.

3. The method of claim 2 including selectively aerating the bulk powder material portions while the latter is moving between the first and second elevated stations.

4. The method of claim 3 including aerating the bulk powder material portions in dependence upon the power demands in moving the bulk powder material portions from the first to the second elevated stations.

5. The method of claim 3 wherein jets of a compressed gaseous medium are directed into the bulk powder material portions as the latter move from the first elevated station to the second elevated station.

* * * * *

UNITED STATES PATENT AND TRADEMARK OFFICE
CERTIFICATE OF CORRECTION

PATENT NO. : 5,351,805
DATED : OCTOBER 4, 1994
INVENTOR(S) : DAVID J. MILLER, ALLEN R. MILLER AND CHARLES P. MILLER

It is certified that error appears in the above-indentified patent and that said Letters Patent is hereby corrected as shown below:

Column 5, lines 62 and 63, "so both" should read -- so that both --;

Column 7, line 51, delete the second occurance of "rotating"; and

Column 9, line 31, before "mobility" insert -- in its use of crawler tracks 213, which lend additional --.

Column 12, line 32, after "station" and before "thereupon" insert -- and --.

Signed and Sealed this

Twenty-ninth Day of November, 1994

Attest:

BRUCE LEHMAN

*Attesting Officer*    *Commissioner of Patents and Trademarks*